United States Patent [19]

Randall, Jr. et al.

[11] 4,113,579

[45] Sep. 12, 1978

[54] PROCESS FOR PRODUCING AN ALUMINUM ELECTROLYTIC CAPACITOR HAVING A STABLE OXIDE FILM

[75] Inventors: John J. Randall, Jr.; Walter J. Bernard, both of Williamstown, Mass.

[73] Assignee: Sprague Electric Company, North Adams, Mass.

[21] Appl. No.: 791,656

[22] Filed: Apr. 28, 1977

[51] Int. Cl.$^2$ .................. C25D 11/12; C25D 5/44
[52] U.S. Cl. .................. 204/33; 204/38 A; 204/58; 204/42
[58] Field of Search .................. 204/33, 58, 38 A, 29, 204/42

[56] References Cited

U.S. PATENT DOCUMENTS

| | | | |
|---|---|---|---|
| 2,396,685 | 3/1946 | Coggins | 41/42 |
| 3,733,291 | 5/1973 | Alwitt | 204/29 |

FOREIGN PATENT DOCUMENTS 1,155,540 10/1973 Fed. Rep. of Germany.
2,238,245 2/1973 Fed. Rep. of Germany.
1,179,486 1/1970 United Kingdom.

OTHER PUBLICATIONS

"Al. Foil in Electroly. Capacitors", N. F. Jackson, BAFRA H-Book, Aston Univ. Symp., 50-64 (1974).
"Elec. Instab. of Composite Al. Oxide Films", R. S. Alwitt et al., 27th Intern. Soc. Electrochem. Mfg., Zurich (9/76).
"Effect of Prep. Conds. of Anodic Oxide Film Growth Process" by Zudova et al., Electrokhimiya, 1975, 11(8), 1239-1243, C.A. 84:81457p, 1976.
"The React. Bet. Anodic Al Oxide & $H_2O$", Bernard et al., J. E.C.S., 108:822-825, (1961).

*Primary Examiner*—R. L. Andrews
*Attorney, Agent, or Firm*—Connolly and Hutz

[57] ABSTRACT

An electrolytic capacitor is provided with an electrode having a stable aluminum oxide dielectric by anodizing an aluminum foil in a process that includes depolarizing the foil in a bath containing a hydration inhibitor selected from tartrate or citrate or phosphate anions.

6 Claims, No Drawings

PROCESS FOR PRODUCING AN ALUMINUM ELECTROLYTIC CAPACITOR HAVING A STABLE OXIDE FILM

BACKGROUND OF THE INVENTION

This invention relates to producing an aluminum electrolytic capacitor having a stable oxide film, and more particularly to producing such a capacitor having an aluminum oxide dielectric that resists interaction with water.

It is known in the electrolytic capacitor art that the formation of dielectric oxide on an aluminum electrode is facilitated by first producing a hydrated oxide film on the electrode and then anodizing the electrode in a formation electrolyte. The formation of the hydrated oxide serves to reduce the electrical energy requirements for the subsequent anodization; while some hydrate is consumed during anodization, some is left over and serves to increase the equivalent series resistance and decrease the capacitance available from the anodized electrode. The capacitance decrease is caused by hydrous oxide plugging of the fine etch structure of high voltage foils. One means for coping with both the advantages and disadvantages of the hydrated oxide is disclosed in U.S. Pat. No. 3,733,291 issued May 15, 1973, wherein the formation process includes the stripping away of any hydrated oxide that remains after anodization.

It is known to depolarize after anodization in the presence of hydrated oxide to deal with an instability evidenced by a sudden loss of field strength after apparently complete film formation. It has been postulated that this instability is caused by gas bubbles trapped in the hydrous oxide layer. Others question this on the basis that a random occlusion of gas bubbles would not account for certain regularities in instability behavior, but do agree there are some sort of voids in the formed film. However, there is general agreement that the unstable state is related to the presence of the hydrous oxide.

Whatever the cause, it is known to remedy the situation by depolarizing techniques—heating, immersion in hot water, secondary anodization, mechanical flexing, pulsed currents, or current reversal—in short, methods which tend to crack the barrier oxide layer slightly.

If the hot water immersion method is used, hydrate in excess of that present initially will be formed if the anodization is carried out using the standard boric acid and/or borate electrolytes. These electrolytes enjoy wide commercial utilization in the formation of dielectric oxide films on aluminum electrodes for use in electrolytic capacitors because of their efficiency and low cost. However, W. J. Bernard and J. J. Randall, Jr., have shown in *J. Electrochem. Soc.* 108, 822, (1961) that the resulting oxide film thus formed is attacked by water to form a non-insulating hydrous oxide. The degradation of the oxide film can occur also by the action of water in rinse baths, in the working electrolyte of the capacitor, or even from exposure to air.

While hydrate formation can be inhibited prior to anodization, and this is of particular importance for low-voltage foils, hydrate formation on high-voltage foils is desirable to reduce energy requirements during anodization. In general these inhibition processes of the prior art require more inhibitor than the present invention.

SUMMARY OF THE INVENTION

An object of this invention is the provision of a process for producing an aluminum electrolytic capacitor having a stable oxide dielectric film.

Another object of this invention is to provide a process for minimizing the amount of hydrated oxide in an aluminum oxide dielectric film in an electrolytic capacitor.

Another object is to provide a process for producing an aluminum oxide dielectric film that will resist subsequent interaction with water.

Another object is the production of a stable aluminum oxide dielectric in an anodization process employing a conventional boric acid and/or borate formation electrolyte.

In accordance with this invention an aluminum electrolytic capacitor is provided with a stable aluminum oxide dielectric film by including a hydration inhibitor in one or more depolarization procedures during anodization of an aluminum electrode.

The process of this invention includes the desirable prior art practice of reducing the electrical energy requirements of anodization by first producing a hydrated oxide film on an aluminum foil by a hot water immersion, and thereafter this invention involves interrupting the anodization procedures to depolarize the oxide film in another hot water bath containing a hydration inhibitor. It has been found that effective inhibiting anions for this invention are phosphate, borate, or alpha- or ortho-hydroxy carboxylic acid anions. In particular, it has been found that the preferred hydration inhibitors are tartrate or citrate or phosphate anions, preferably present in a range of from 0.0001 to 0.5 M. The preferred cations are ammonium, sodium, and potassium, although other water soluble salts are satisafactory. The preferred salt of this invention is 0.1 M diammonium citrate.

The use of the hydration inhibitors of this invention in depolarization inhibits the formation of new hydrate while still permitting depolarization. In addition, the adsorption of the inhibiting compounds on the oxide film produces a finished foil that is not as susceptible to hydration in the capacitor.

The use of the hydration inhibitors of this invention allows the use of higher gain etched foil, because inhibition of the formation of hydrous oxide during depolarization results in far less clogging of the fine pores of the etch structure. That is, the hydration inhibitors of this invention prevent hydration throughout the entire etch structure. The stripping practice of U.S. Pat. No. 3,733,291 varies from outside to inside of the etch structure and results in a structure of less-uniformly thin hydrate layer.

We have found that presence of the hydration inhibitors of this invention reduces the harmful influence on equivalent series resistance of excess initial hydrous oxide in the finished foil. In other words, not only does the inhibitor prevent the formation of additional hydrous oxide during the depolarizing procedures, but it dissolves some excess initial hydrous oxide. The use of hydration inhibitors in depolarization also results in the replacement by inhibiting anions of hydroxy groups from the initial hydrated oxide.

DESCRIPTION OF THE PREFERRED EMBODIMENTS

It is important to control the conditions within the depolarization chamber when practising the hydrous oxide inhibition of this invention, as complete inhibition of hydration tends to prevent depolarization. Hydration inhibition and depolarization can be achieved simultaneously in accordance with this invention by utilization of the preferred inhibitors which exert a slight dissolving action on the barrier oxide film. This dissolution of the outer part of the film opens up the surface to permit depolarization. Control of the pH and resistivity during depolarization limits the film dissolution so as to avoid large expenditure of charge that would be required to reform any large amount of barrier film dissolution.

It has been found that the final amount of hydrous oxide on an electrode foil is much less when the pH is in the 4 to 5 range and additive concentration is higher than $10^{-4}$ M. Table I shows weight changes that were observed when 200 volt films formed in a borate electrolyte were immersed in boiling aqueous solutions of alpha- or ortho-hydroxycarboxylic acid anions. The critical additive concentrations as to whether or not hydration occurs are $10^{-4}$ to $10^{-5}$ M. In every instance, over the pH range 4–7 the films gained weight when the additive concentration was $10^{-5}$ M, while at $10^{-4}$ M concentration level either weight gains or weight losses may be observed, depending on conditions. Since hydration is the only conceivable process which could give rise to a weight gain, these results mean that the barrier oxide will inevitably hydrate when additive concentration is $10^{-5}$ M or less.

TABLE I

| Material | Concentration (M) | pH | ΔW (mg/in²) |
|---|---|---|---|
| Tartaric acid | $10^{-4}$ | 4.1 | −0.32 |
|  | $10^{-5}$ | 4.4 | +0.77 |
| Tartaric acid (partially neutralized) | $10^{-4}$ | 5.0 | +0.10 |
|  | $10^{-5}$ | 5.0 | +0.89 |
|  | $10^{-4}$ | 7.0 | −0.04 |
|  | $10^{-5}$ | 7.0 | +1.413 |
| Citric acid | $10^{-4}$ | 4.1 | −0.45 |
|  | $10^{-5}$ | 4.5 | +0.48 |
| Citric acid | $10^{-4}$ | 5.0 | −0.38 |

TABLE I-continued

| Material | Concentration (M) | pH | ΔW (mg/in²) |
|---|---|---|---|
| (partially neutralized) | $10^{-5}$ | 5.0 | +0.41 |
|  | $10^{-4}$ | 7.0 | −1.03 |
|  | $10^{-5}$ | 7.0 | +0.26 |
| Malic acid | $10^{-4}$ | 4.1 | −0.27 |
|  | $10^{-5}$ | 4.5 | +2.17 |
| Malic acid (partially neutralized) | $10^{-4}$ | 5.0 | +0.02 |
|  | $10^{-5}$ | 5.0 | +2.82 |
|  | $10^{-4}$ | 7.0 | +0.63 |
|  | $10^{-5}$ | 7.0 | +2.63 |

The effectiveness of the addition of the preferred hydration inhibitors of this invention to the water in the depolarization of anodized aluminum foil is shown in Table II. The data of Table II were collected for the several inhibitors at different concentration levels and different pHs. Foil having fine etched structure was anodized (formed) to 200 volts in a glycol borate electrolyte at 25° C. The samples were then immersed in boiling aqueous media with or without an added inhibitor for a period of 10 minutes. Film degradation was monitored in three ways:

(1) Samples were weighed before and after the boiling immersion.

(2) Capacitance was measured before and after immersion.

(3) The time required to reanodize the specimen to the original voltage after the boiling immersion was recorded.

As judged by all three of the above methods, hydration occurred only in the case of pure water as shown by the weight increase of the foil. In all other cases, weight losses were observed which indicate that some dissolution of aluminum oxide took place with all of the hydration inhibitors of this invention.

TABLE II

| Material | Conc. (M) | pH | ΔW (mg/in²) 10-min. Boil | Δ1/C (%) 10-Min. Boil | Reform Time (Seconds) |
|---|---|---|---|---|---|
| Tartaric acid | 0.1 | 2.1 | −0.71 | 9 | 35 |
|  | 0.01 | 2.6 | −0.73 | 7 | 20 |
|  | 0.001 | 3.1 | −0.69 | 6 | 20 |
| Citric acid | 0.1 | 2.1 | −0.43 | 5 | 10 |
|  | 0.01 | 2.65 | −0.48 | 5 | 12 |
|  | 0.001 | 3.2 | −0.62 | 3 | 20 |
| Disodium tartrate | 0.1 | 4 | −0.62 | 3 | 50 |
|  | 0.1 | 5 | −0.63 | 1 | 10 |
|  | 0.1 | 6 | −1.14 | 10 | 40 |
|  | 0.1 | 7 | −3.61 | 36 | 223 |
|  | 0.01 | 5 | −0.59 | 2 | 27 |
|  | 0.001 | 5 | −0.26 | 0 | 2 |
| Diammonium citrate | 0.1 | 4 | −0.41 | 2 | 2 |
|  | 0.1 | 5 | −0.42 | 0 | 2 |
|  | 0.1 | 6 | −0.65 | 3 | 2 |
|  | 0.1 | 7 | −0.95 | 9 | 56 |
|  | 0.01 | 5 | −0.62 | 1 | 26 |
|  | 0.001 | 5 | −1.26 | 8 | 83 |
| Sodium dihydrogen phosphate | 0.1 | 3.5 | −0.034 | 0 | 2 |
|  | 0.01 | 4.5 | −0.029 | 0 | 2 |
| Boric Acid | 0.016 (1%) |  | −0.062 | 0 | 8 |
|  | 0.081 (5%) |  | −0.18 | 0 | 10 |
| H₂O | pure, distilled |  | +2.06 | 51 | 223 |

ΔW is the change in weight from the original oxide weight of 9.94 mg/in²; and Δ1/C is proportional to the percent change in film thickness as measured by the percent of original reciprocal capacitance.

What is claimed is:

1. The process for producing an aluminum electrolytic capacitor having a stable oxide film comprising forming a hydrated oxide layer on an aluminum foil, and then anodizing said foil in a formation electrolyte containing borate anions, then depolarizing said anodized foil in a bath containing a hydration inhibitor selected from phosphate, borate, and alpha- or ortho-hydroxy carboxylic acid anions, the pH of said bath being between 2 and 7, and then reanodizing said foil.

2. The process of claim 1 wherein said foil is etched, and said hydration inhibitor is selected from tartrate, citrate, and phosphate anions.

3. The process of claim 2 wherein said hydration inhibitor is selected from hydrogen, ammonium, sodium, and potassium cations with the proviso that when the anion is phosphate, the cation is ammonium, sodium, or potassium.

4. The process of claim 3 wherein said hydration inhibitor is 0.1 M diammonium citrate.

5. The process of claim 2 wherein said hydration inhibitor is present in a concentration of greater than $10^{-5}$ M.

6. The process of claim 2 wherein the pH is in the range of 4 to 5.

* * * * *